(12) United States Patent
Tanimoto et al.

(10) Patent No.: US 11,620,090 B2
(45) Date of Patent: Apr. 4, 2023

(54) PRINTER PROVIDED WITH MODE IN WHICH PRINT BASED ON PRINT JOB TRANSMITTED FROM CLIENT DEVICE IS RESTRICTED

(71) Applicant: BROTHER KOGYO KABUSHIKI KAISHA, Nagoya (JP)

(72) Inventors: Satoshi Tanimoto, Nagoya (JP); Kosuke Mori, Handa (JP); Yuqing Liu, Nagoya (JP); Katsunori Enomoto, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/467,988

(22) Filed: Sep. 7, 2021

(65) Prior Publication Data

US 2022/0100435 A1 Mar. 31, 2022

(30) Foreign Application Priority Data

Sep. 30, 2020 (JP) .............................. JP2020-164734

(51) Int. Cl.
*G06F 3/12* (2006.01)
(52) U.S. Cl.
CPC .......... *G06F 3/1203* (2013.01); *G06F 3/1271* (2013.01); *G06F 3/1288* (2013.01)
(58) Field of Classification Search
CPC ..... G06F 3/1203; G06F 3/1271; G06F 3/1288
See application file for complete search history.

(56) References Cited

U.S. PATENT DOCUMENTS

| | | | | |
|---|---|---|---|---|
| 2004/0223179 | A1* | 11/2004 | Mentze | G06F 3/1288 719/321 |
| 2007/0091346 | A1* | 4/2007 | Ogura | G06K 15/00 358/1.14 |
| 2010/0253975 | A1 | 10/2010 | Ida et al. | |
| 2011/0242573 | A1* | 10/2011 | Takahara | H04N 1/00954 358/1.13 |

(Continued)

FOREIGN PATENT DOCUMENTS

| | | | |
|---|---|---|---|
| JP | 2005067072 A | * | 3/2005 |
| JP | 2010-244550 A | | 10/2010 |
| JP | 2011-056918 A | | 3/2011 |

*Primary Examiner* — Huo Long Chen
(74) *Attorney, Agent, or Firm* — Scully, Scott, Murphy & Presser, PC (57) ABSTRACT

A printer includes a controller, a memory, and a user interface. The printer has a first mode and a second mode. The controller disables the first mode when enabling the second mode and disables the second mode when enabling the first mode. The controller executes a first printing process while the first mode is enabled. In the first printing process, the controller receives a print job from a client device, stores the received print job in the memory, and performs printing based on the stored print job upon receiving a storage print command. The controller executes a second printing process and restricts the first printing process while the second mode is enabled. In the second printing process, the controller receives a print job from a server in response to receiving a prescribed input operation via the user interface, and performs printing based on the received print job from the server.

13 Claims, 8 Drawing Sheets

(56) References Cited

U.S. PATENT DOCUMENTS

| | | | |
|---|---|---|---|
| 2012/0212760 A1* | 8/2012 | Sakura | G06F 3/1204 358/1.13 |
| 2015/0092219 A1* | 4/2015 | Kanemoto | H04N 1/00244 358/1.14 |
| 2019/0050184 A1* | 2/2019 | Ozawa | G06F 3/1222 |

* cited by examiner

PRINTER PROVIDED WITH MODE IN WHICH PRINT BASED ON PRINT JOB TRANSMITTED FROM CLIENT DEVICE IS RESTRICTED

CROSS REFERENCE TO RELATED APPLICATION

This application claims priority from Japanese Patent Application No. 2020-164734 filed Sep. 30, 2020. The entire content of the priority application is incorporated herein by reference.

TECHNICAL FIELD

The present disclosure relates to a printer and a printing system including a printer.

BACKGROUND

Some printers known in the art possess a pull printing mode in which the printer pulls a print job held on a server device in response to a prescribed input operation and performs printing based on the print job. Japanese Patent Publication Application No. 2011-056918 describes one such printer. In the technology of the publication '918, a client device stores a print job on a server device in association with user identification information, the server device transfers this print job to a printer in response to a request from the printer, and the printer performs printing in response to receiving the print job from the server device.

SUMMARY

In addition to the pull printing mode described above, some printers possess a storage printing mode. In this storage printing mode, the printer receives a print job directly from a client device but stores the print job in the printer's memory rather than immediately beginning to perform printing based on the print job. The printer performs printing only after being instructed to perform printing based on the stored print job, such as receiving a print command. In a printing system including this kind of printer, the user of a client device attempting to store a print job on a server device with the intention of performing printing using the pull printing mode, for example, may unintentionally store the print job on the printer. In such cases, the user might lose track of the print job and leave the print job stored on the printer. This can compromise the security of the print job in the event that a third party subsequently uses the printer.

In view of the foregoing, it is an object of the present disclosure to provide a technology for improving the security of print jobs when using a printer that supports an on-device storage function in a printing system having a server device configured to be connected to the printer and a client device.

In order to attain the above and other objects, according to one aspect, the present disclosure provides a printer including a printing engine, a user interface, a communication interface, a memory, and a controller. The controller is configured to perform: (a) disabling a first mode of the printer when enabling a second mode of the printer; (b) disabling the second mode when enabling the first mode; (c) executing a first printing process in a state where the first mode is enabled, the first printing process including: (c1) in response to receiving a print job from a client device via the communication interface, storing the received print job in the memory; and (c2) in response to receiving a storage print command, controlling the printing engine to perform a print based on a first specific print job, the storage print command being a print command to print based on the first specific print job, the first specific print job being the print job stored in the memory in (c1); (d) executing a second printing process in a state where the second mode is enabled, the second printing process including: (d1) accepting a prescribed input operation via the user interface; (d2) in response to accepting the prescribed input operation in (d1), receiving a print job from a server via the communication interface, the server including a server memory, the print job received from the server being a print job stored in the server memory by the server in response to the print job being received by the server from the client device; and (d3) controlling the printing engine to perform a print based on a second specific print job, the second specific print job being the print job received from the server in (d2); and (e) in a state where the second mode is enabled, restricting the first printing process based on a print job transmitted from the client device.

According to another aspect, the present disclosure provides a printing system including a printer, a server, and a client device which are configured to communicate with one another. The printer includes a printer memory and a user interface and is provided with a first mode and a second mode. The printer is configured to: disable the first mode when enabling the second mode; and disable the second mode when enabling the first mode. The client device possesses: a function to output a first print job, the first print job being a print job whose transmission destination is set to the printer; and aa function to output a second print job, the second print job being a print job whose transmission destination is set to the server. The server includes a server memory. The server is configured to: in response to receiving the second print job from the client device, store the received second print job in the server memory. The printer is further configured to, in a state where the first mode is enabled: receive the first print job from the client device; store the received first print job in the printer memory; and in response to receiving a storage print command, perform a print based on the stored first print job, the storage print command being a print command to print based on the stored first print job. The printer is further configured to, in a state where the second mode is enabled: accept a prescribed input operation via the user interface; in response to accepting the prescribed input operation, receive the second print job stored in the server memory from the server via the communication interface; perform a print based on the received second print job; and restrict a print based on the first print job.

A control method and computer program for implementing the printer's functions, and a computer-readable storage medium for storing the program are all novel and useful.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Next, a printing system according to one embodiment of the present disclosure will be described while referring to the accompanying drawings. In the printing system according to this embodiment, printers are controlled using personal computers (hereinafter abbreviated as "PC") to execute printing operations.

Figure 1:
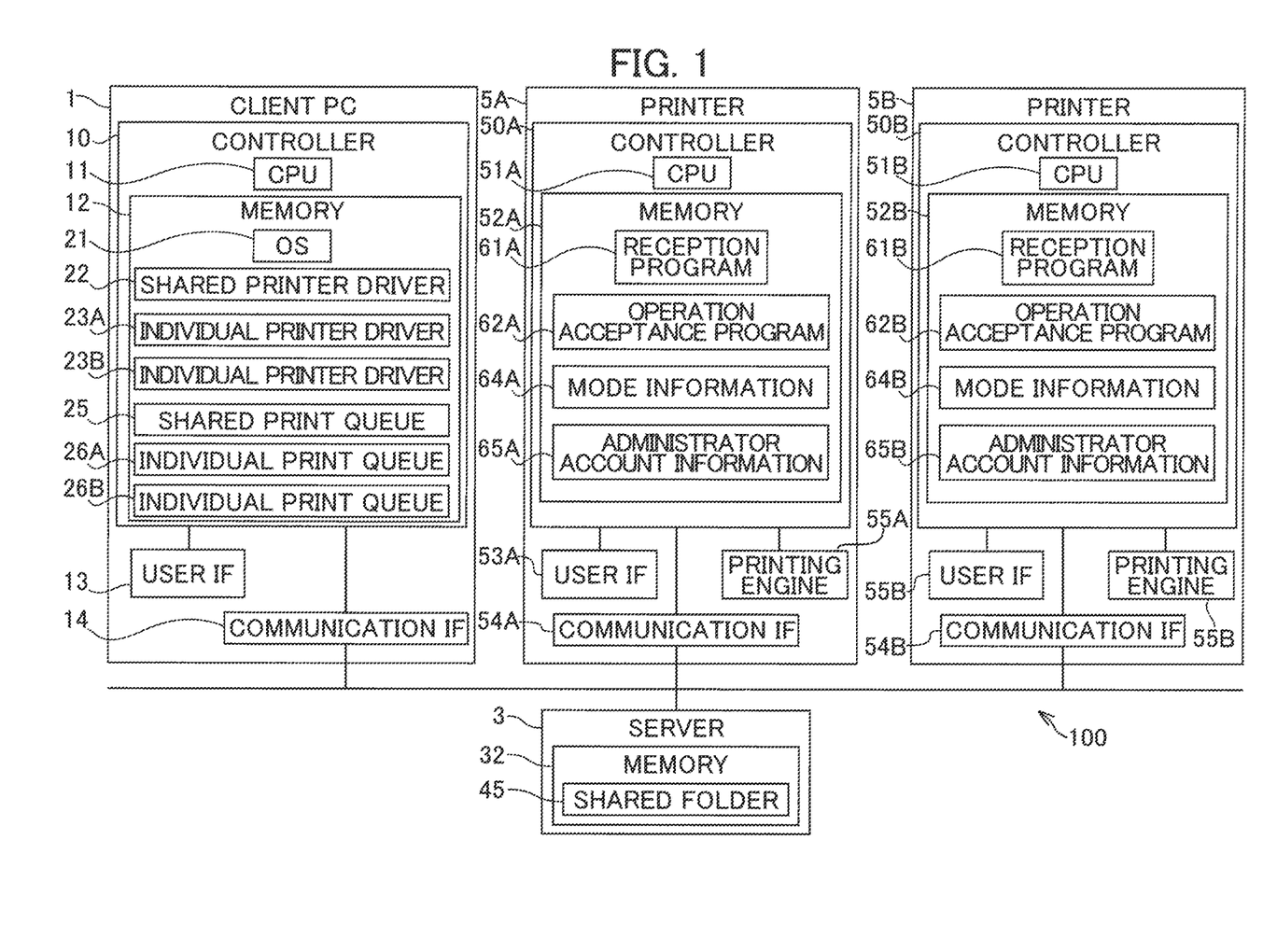
FIG. 1 is a block diagram illustrating the electrical configuration of a printing system according to one embodiment of the present disclosure.

FIG. 1 shows a printing system 100 as an example of the printing system according to the present embodiment. The printing system 100 includes a client PC 1, a server 3, a printer 5A, and a printer 5B. The client PC 1, printer 5A, and printer 5B are all connected to and capable of communicating with the server 3. The client PC1 is an example of the client device.

The client PC 1 of the present embodiment at least has a function for receiving a print command through a user operation, and a communication function. As shown in FIG. 1, the client PC 1 is provided with a controller 10 that includes a CPU 11 and a memory 12. The client PC 1 is also provided with a user interface 13, and a communication interface 14. The user interface 13 and communication interface 14 are electrically connected to the controller 10. Note that the controller 10 in FIG. 1 is a general concept that covers all hardware and software used for controlling the client PC 1 or the like and does not actually represent a single piece of hardware present in the client PC 1 or the like. The same is true with respect to the controllers of other devices described later.

The CPU 11 executes various processes according to programs read from the memory 12 and based on user operations. The memory 12 is a storage area for storing various programs and various data. The programs stored in the memory 12 include a startup program for starting up the client PC 1, and various application programs (hereinafter simply called "apps") for using the printers 5A and 5B. The data stored in the memory 12 include image data and document data. The memory 12 is also used as a work area for executing various processes.

Examples of the memory provided in each device, such as the memory 12, may be a built-in ROM, RAM, hard disk drive, or the like or may be any storage medium that is readable and writable by the CPU 11. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The user interface 13 includes hardware for displaying screens that report information to the user, and hardware for receiving operations performed by the user. The user interface 13 may have a touchscreen that is provided with both a display function and a function for receiving operations or may be a set of devices that include a display provided with a display function and a keyboard, mouse, trackball, or the like provided with operation-receiving functions.

The communication interface 14 includes hardware for communicating with external devices such as the server 3, the printer 5A, and the printer 5B. The communication method of the communication interface 14 may be wired or wireless and may conform to any of various communication standards, such as Ethernet (registered trademark) and Wi-Fi (registered trademark). The communication interface 14 of the client PC 1 may also have a plurality of configurations supporting a plurality of communication standards.

As shown in FIG. 1, the memory 12 of the client PC 1 stores various data and various programs that include an operating system (hereinafter abbreviated as "OS") 21, a shared printer driver 22, an individual printer driver 23A, an individual printer driver 23B, a shared print queue 25, an individual print queue 26A, and an individual print queue 26B. The OS 21 may be Windows (registered trademark), macOS (registered trademark), iOS (registered trademark), Android (registered trademark), or Linux (registered trademark), for example.

The shared printer driver 22 is a program for performing printing operations through use of the server 3. The individual printer drivers 23A and 23B are programs respectively supporting the printers 5A and 5B for performing various processes for controlling the printers 5A and 5B to print.

The shared print queue 25 is provided for the shared printer driver 22. The server 3 is set as the transmission destination in the shared print queue 25. The individual print queues 26A and 26B are provided for the individual printer drivers 23A and 23B, respectively. The printers 5A and 5B are set as the respective transmission destinations in the individual print queues 26A and 26B. The printers 5A and 5B in the present embodiment may be devices of the same model. In this case, the printer drivers 22, 23A, and 23B may be a single common printer driver, and the three print queues 25, 26A, and 26B may be provided for the single common printer driver. Each of the individual print queues 26A and 26B is an example of the first print queue. The shared print queue 25 is an example of the second print queue.

The server 3 according to the present embodiment is a device at least having a function for storing print data, and a communication function. As shown in FIG. 1, the server 3 is provided with a memory 32. The memory 32 holds a shared folder 45 for storing print jobs. The shared folder 45 is a folder made available on a network through a function of the OS provided in the server 3. The shared folder 45 is also accessible from external devices other than the server 3, such as the client PC 1, the printer 5A, and the printer 5B. User permissions specifying accessibility may be set for the shared folder 45.

Both the printers 5A and 5B in the present embodiment are devices that at least have a function for printing images based on image data, and a communication function. The printers 5A and 5B have the same configuration and perform the same operations and processes, and only the suffix "A" on the printer 5A is changed to "B" for the printer 5B. The following description will focus primarily on the printer 5A. Further, in the following description, the printer 5A may be referred to as "Printer A" while the printer 5B is referred to as "Printer B."

As shown in FIG. 1, the printer 5A is provided with a controller 50A that includes a CPU 51A, and a memory 52A. The printer 5A is also provided with a user interface 53A, a communication interface 54A, and a printing engine 55A, which are all electrically connected to the controller 50A. The CPU 51A is an example of the controller.

The user interface 53A is a touchscreen, for example. The touchscreen includes hardware to display screens that report information to the user, and hardware to receive operations performed by the user. Alternatively, the user interface 53A may be a set of components including a screen for displaying information, and input buttons. The communication interface 54A includes hardware to communicate with external devices, such as the client PC 1 and server 3. The communication interface 54A may employ any type of communication standard and mode of communication.

The memory 52A of the printer 5A stores various programs and data, including a reception program 61A, an operation acceptance program 62A, mode information 64A, and administrator account information 65A. The reception program 61A is executed to implement a process concerning print jobs received from the client PC 1. The operation acceptance program 62A is executed to implement a process concerning user operations via the user interface 53A.

The mode information 64A is information storing the status of modes set for the printer 5A. The printer 5A has a storage mode and a shared mode. Each of these modes is either enabled or disabled based on the mode information 64A. In the storage mode, the printer 5A stores print jobs in the memory 52A of the printer 5A and executes storage printing for printing images based on the stored print jobs in response to operations on the user interface 53A. In the shared mode, the printer 5A reads print jobs stored in the shared folder 45 on the server 3 and executes shared printing to print images based on the read print jobs. The storage mode is an example of the first mode. The shared mode is an example of the second mode. The storage printing is an example of the first printing process. The shared printing is an example of the second printing process.

The printer 5A does not set the mode information 64A such that the storage mode and the shared mode are both enabled. That is, the printer 5A does not enable the shared mode when the storage mode is enabled, and the printer 5A does not enable the storage mode when the shared mode is enabled. In other words, the printer 5A disables the shared mode when enabling the storage mode, and the printer 5A disables the storage mode when enabling the shared mode. However, both the storage mode and the shared mode may be disabled for the printer 5A at the same time.

The administrator account information 65A is information on accounts having administrator privileges in the printing system 100. Using the administrator account information 65A, the printer 5A can read information from and write information to the shared folder 45 on the server 3. Note that the administrator account information 65A need not necessarily represent accounts for administrators of the printing system 100 provided that the administrator account information 65A represents accounts having reading and writing permissions.

Next, various procedures performed on the printing system 100 of the present embodiment will be described with reference to flowcharts. The procedures and process steps are essentially processes performed by the CPU 11 or the like according to instructions described in programs. That is, each process with an action description such as "determine," "extract," "select," "calculate," "set," "identify," "acquire," "receive," and "control" represents a process performed by the CPU. Each of the processes performed by the CPU may include hardware control using the API in the OS of the device. However, a description of the role of the OS is omitted in this specification when describing the operations of programs. That is, a description below that indicates "program B controls hardware C" may indicate that "program B controls hardware C using the API of the OS." Further, a process executed by the CPU according to instructions in a program may be described using abbreviated expressions, such as "the CPU executes." Similarly, a process executed by the CPU according to instructions in a program may be described using expressions that omit the CPU, such as "program A executes."

Note that the term "acquire" in this specification is used as a concept that does not necessarily require a request. In other words, a process by which the CPU receives data without requesting that data is included in the concept of "the CPU acquires data." Further, the term "data" described herein is expressed as bit strings that can be read by a computer. Data of different formats are treated as the same data when the content of the data is essentially the same. The same holds true for "information" in this specification. Further, the terms "requesting" and "instructing" are concepts that denote outputting information to another device indicating a request and an instruction, respectively. Further, information indicating a request and information indicating an instruction will simply be described as a "request" and an "instruction," respectively.

Further, a process performed by the CPU to determine whether information A indicates circumstance B may be described conceptually as "determining whether circumstance B based on information A." A process in which the CPU determines whether information A indicates circumstance B or circumstance C may be described conceptually as "determining whether circumstance B or circumstance C based on information A."

Figure 2:
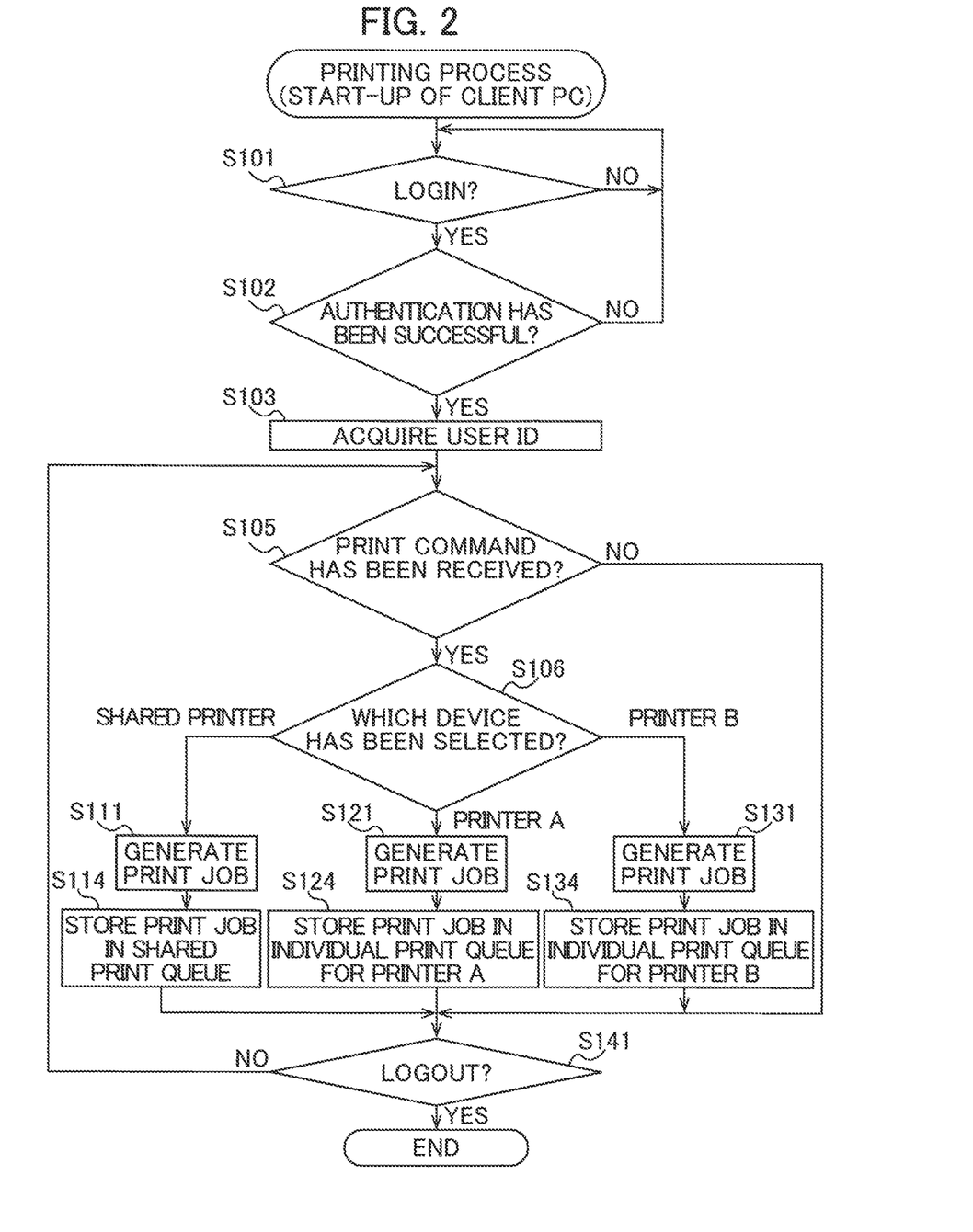
FIG. 2 is a flowchart illustrating steps in a printing process performed in the printing system.

Next, steps in a printing process for implementing a storage procedure will be described with reference to the flowchart in FIG. 2. This printing process is a process when the client PC 1 receives a print command from the user. The CPU 11 of the client PC 1 begins this printing process in response to the client PC 1 being started up. The printing process of FIG. 2 is performed according to the OS 21 on the client PC 1.

In S101 at the beginning of the printing process, the CPU 11 determines whether login information inputted via the user interface 13, for example, has been received. Login information contains a set including a user ID and a password, for example. Login information may also be inputted into the client PC 1 by scanning an ID card, fingerprint, or palmprint, for example.

When the CPU 11 determines that login information has been received (S101: YES), in S102 the CPU 11 determines whether authentication has been successful based on the received login information. The CPU 11 may perform authentication on the client PC 1 or may perform authentication using an external device such as an authentication server. If the CPU 11 determines that login information has not been received (S101: NO) or if the CPU 11 determines that authentication has not been unsuccessful (S102: NO), the CPU 11 returns to S101 and once again accepts login information. On the other hand, if the CPU 11 determines that authentication has been successful (S102: YES), in S103 the CPU 11 acquires the user ID for the logged-in user based on the received login information.

In S105 the CPU 11 determines whether a print command has been received. The client PC 1 receives print commands through apps for creating and editing such content as documents, diagrams, or images, for example. When the CPU 11 receives a command other than a print command to execute one of various other processes, the CPU 11 executes the process based on the received command.

Figure 3A:
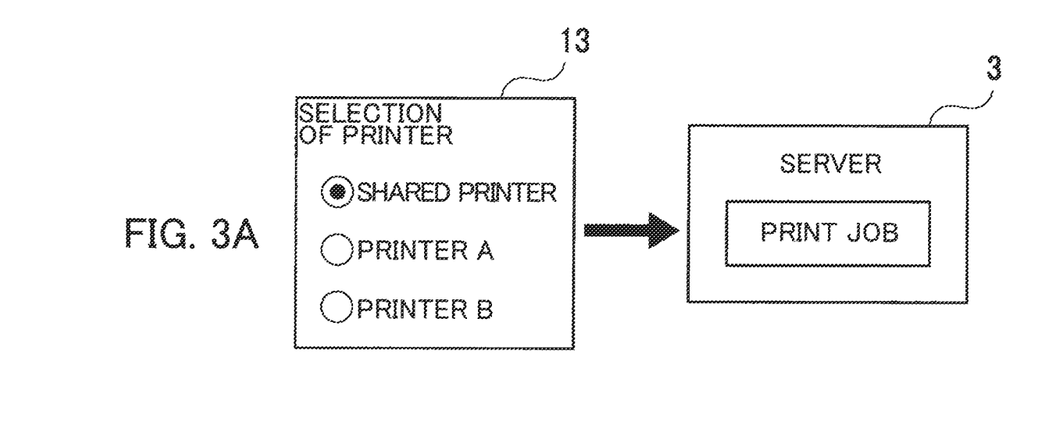
FIG. 3A is an explanatory view illustrating a storage location of a print job according to a selected device in the printing system, and specifically illustrates a case where the selected device is a shared printer.
Figure 3B:
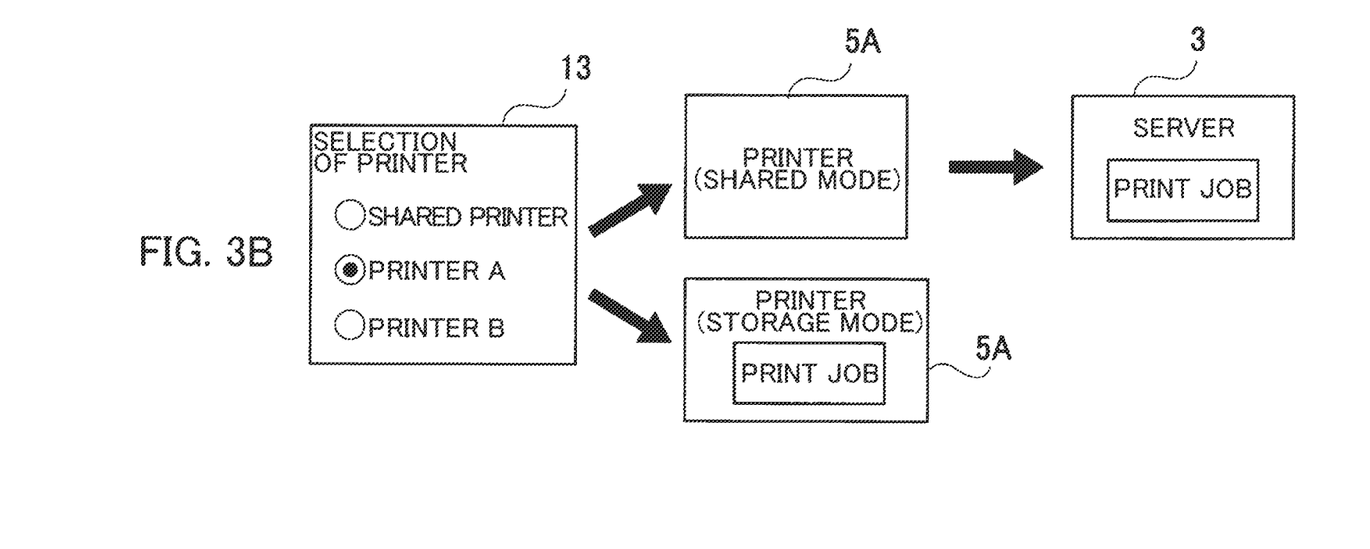
FIG. 3B is an explanatory view illustrating a storage location of a print job according to a selected device in the printing system, and specifically illustrates a case where the selected device is an individual printer.

If the CPU 11 determines that a print command has been received (S105: YES), in S106 the CPU 11 acquires information on the device selected in the print command. For example, the app that receives the print command displays a screen on the user interface 13 for accepting a device selection, as illustrated in FIGS. 3A and 3B, and receives a user selection. The app receives a selection of a print queue as the device selection. By selecting a print queue, the user indirectly selects a printer. The client PC 1 according to the present embodiment receives a user selection from among shared printer, printer 5A, and printer 5B.

If the CPU 11 determines that the selected device is the shared printer (S106: shared printer), in S111 the CPU 11 uses the shared printer driver 22 to generate a print job based on the image data received in the print command Through the OS 21, the shared printer driver 22 acquires data for the content to be printed and the user ID acquired in S103 and generates a print job that includes the user ID, i.e., a print job having the user ID added thereto. The user ID included in the print job (i.e., the user ID added to the print job) is used for identifying the user of the print job in a printing procedure described later.

A print job generated on the client PC 1 includes command data such as Printer Job Language (PJL) data specifying processing commands for controlling the printer. The user ID is added as PJL data. Some print jobs include both command data and data for the image to be printed while others include only command data. Examples of image data are Printer Command Language (PCL) data, PostScript (PS) data, and Portable Document Format (PDF) data.

In S114 the CPU 11 stores the print job having the user ID added thereto in the shared print queue 25, i.e., the print queue associated with the shared printer driver 22. The shared print queue 25 is provided for shared printing, and the transmission destination of the shared print queue 25 is set to the shared folder 45 on the server 3. That is, the transmission destination of print jobs stored in the shared print queue 25 is set to the shared folder 45 on the server 3.

On the other hand, if the CPU 11 determines in S106 that the selected device is the printer 5A (S106: Printer A), in S121 the CPU 11 uses the individual printer driver 23A corresponding to the printer 5A to generate a print job based on the image data received in the print command. In S124 the CPU 11 stores the generated print job in the individual print queue 26A. The individual print queue 26A is the print queue whose transmission destination is set to the printer 5A. That is, the transmission destination of print jobs stored in the individual print queue 26A is set to the printer 5A. Here, the CPU 11 may either add or not add the user ID to the print job.

However, if the CPU 11 determines in S106 that the selected device is the printer 5B (S106: Printer B), in S131 the CPU 11 uses the individual printer driver 23B corresponding to the printer 5B to generate a print job based on the image data received in the print command. In S134 the CPU 11 stores the generated print job in the individual print queue 26B. The individual print queue 26B is the print queue whose transmission destination is set to the printer 5B. That is, the transmission destination of print jobs stored in the individual print queue 26B is set to the printer 5B. Here, the CPU 11 may add or not add the user ID to the print job.

After completing one of the steps S114, S124, and S134 or when the CPU 11 determines in S105 that a print command has not been received (S105: NO), in S141 the CPU 11 determines whether a logout command has been received. If the CPU 11 determines that a logout command has not been received (S141: NO), the CPU 11 returns to S105 and accepts any of various types of commands including a print command. However, if the CPU 11 determines that a logout command has been received (S141: YES), the CPU 11 ends the printing process.

The OS 21 of the client PC 1 transmits the print job that has been stored in a print queue in S114, S124, or S134 of the printing process to the transmission destination set for that print queue. Thus, the client PC 1 has a configuration for outputting print jobs whose transmission destination is set to the printer 5A or printer 5B, and a configuration for outputting print jobs whose transmission destination is set to the server 3.

For example, a print job stored in the shared print queue 25 in S114 is transmitted to the server 3 and stored on the server 3, as illustrated in FIG. 3A. When storing a received print job in the shared folder 45, the server 3 creates a folder in the shared folder 45 having a name corresponding to the user ID added to the print job, for example. The server 3 then stores the received print job in this folder. On the other hand, a print job stored in the individual print queue 26A in S124 is transmitted to the printer 5A, as illustrated in FIG. 3B. Similarly, a print job stored in the individual print queue 26B in S134 is transmitted to the printer 5B.

Figure 4:
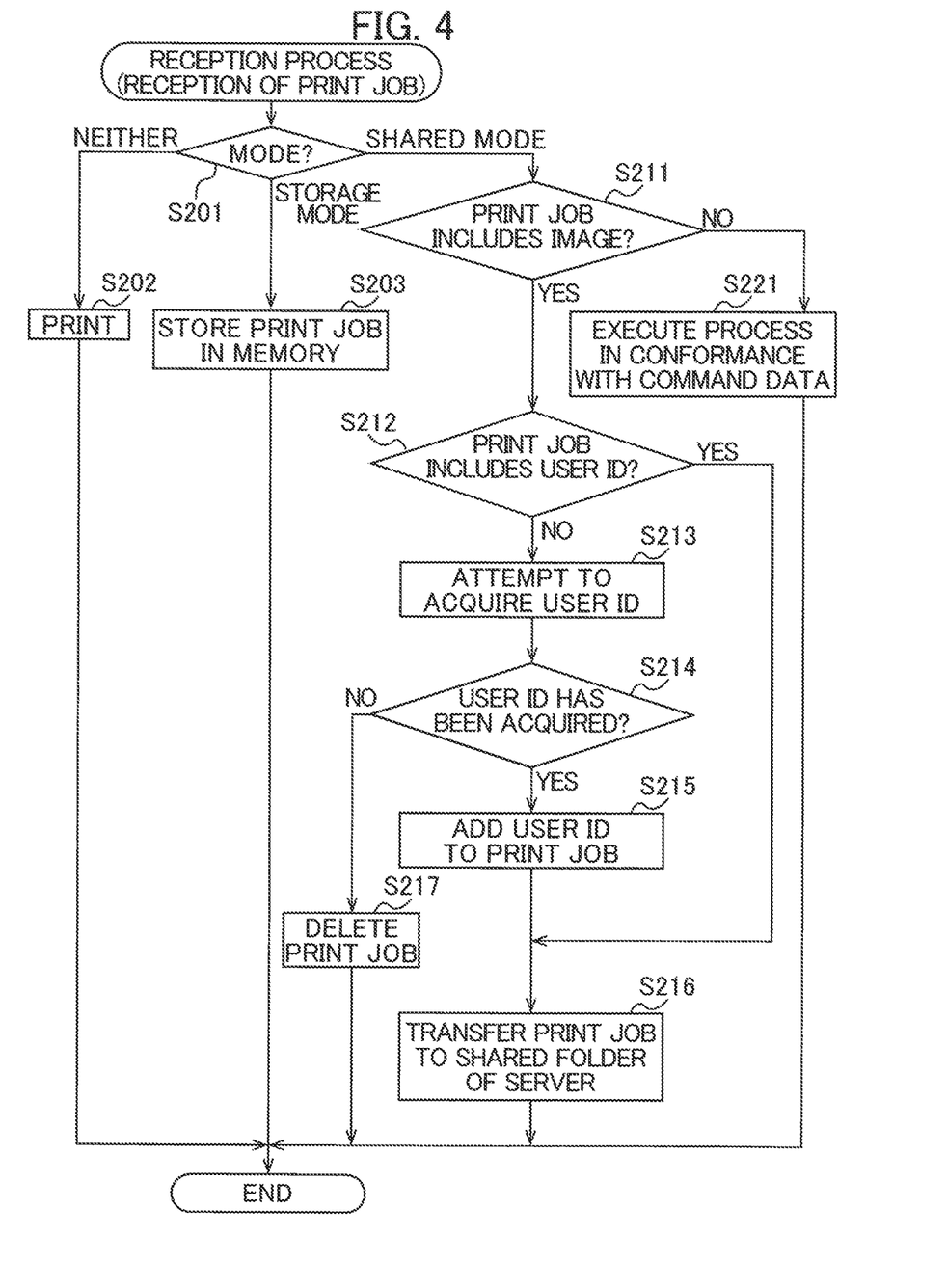
FIG. 4 is a flowchart illustrating steps in a reception process performed in the printing system.

Next, steps in a reception process executed on the printer 5A will be described with reference to the flowchart in FIG. 4. The reception process is performed according to the reception program 61A. The CPU 51A of the printer 5A executes the reception process in response to receiving a print job from the client PC 1.

In S201 at the beginning of the reception process, the CPU 51A acquires the mode settings for the printer 5A. The CPU 51A determines whether the storage mode or the shared mode for the printer 5A is enabled based on the mode information 64A stored in the memory 52A. If the CPU 51A determines that both the storage mode and the shared mode are disabled (S201: neither), in S202 the CPU 51A controls the printing engine 55A to execute a print based on the received print job.

If the CPU 51A determines that the storage mode is enabled (S201: storage), in S203 the CPU 51A stores the received print job in the memory 52A. Through this process, a print job is stored on the printer 5A set to the storage mode, as illustrated in FIG. 3B.

If the CPU 51A determines that the shared mode is enabled (S201: shared), in S211 the CPU 51A analyzes the print job received from the client PC 1 to determine whether the print job includes an image to be printed.

If the CPU 51A determines that the print job includes an image (S211: YES), in S212 the CPU 51A determines whether a user ID has been added to the print job. If a user ID has not been added (S212: NO), in S213 the CPU 51A attempts to acquire information on the user ID from the client PC 1 that transmitted the print job. In S214 the CPU 51A determines whether a user ID could be acquired, i.e., whether acquisition of a user ID has been successful. When transmitting the print job, the client PC 1 may transmit a PC name identifying the client PC 1 in association with the print job, for example. If this PC name includes the user ID for the user currently logged in to the client PC 1, the CPU 51A of the printer 5A can acquire the user ID based on this PC name.

If the CPU 51A was able to acquire the user ID, i.e., acquisition of the user ID has been successful (S214: YES), in S215 the CPU 51A adds the acquired user ID to the print job received from the client PC 1. After completing the process in S215 or when the CPU 51A determines in S212 that a user ID has been added to the print job (S212: YES), in S216 the CPU 51A transfers the print job to the shared folder 45 on the server 3. For example, the printer 5A uses the administrator account information 65A to access the server 3 and transmits the print job to the server 3. Through this process, the print job is stored on the server 3 and not on the printer 5A set to the shared mode, as illustrated in the example of FIG. 3B. The process of S216 is a process in which the CPU 51A of the printer 5A does not store the received print job in the memory 52A of the printer 5A.

On the other hand, if the CPU 51A determines that a user ID could not be acquired, i.e., acquisition of the user ID has not been successful (S214: NO), in S217 the CPU 51A deletes the print job received from the client PC 1. The process of S217 is a process in which the CPU 51A of the printer 5A does not store the received print job in the memory 52A of the printer 5A. Here, when the CPU 51A determines in S211 that the print job received from the client PC 1 includes an image, the CPU 51A may simply delete all print jobs without performing the determination in S212. In other words, steps S212-S216 may be omitted.

Further, if the CPU 51A determines that the print job does not include an image (S211: NO), i.e., when the CPU 51 determines that the print job contains only command data, in S221 the CPU 51A executes a process in conformance with the command data. The command data may include commands for modifying settings on the printer 5A or commands for updating programs, for example. After completing any of steps S202, S203, S216, S217, or S221, the CPU 51A ends the reception process.

Alternatively, the configuration may be employed in which the CPU 51A does not receive a print job when determining that the shared mode is enabled. That is, in response to receiving information from the client PC 1 specifying the start of a print job transmission, the CPU 51A may read the mode information 64A and deny reception when determining that the shared mode is enabled. Since this action results in a transmission error on the client PC 1, the user who transmitted the print job can easily recognize that such transmission is the wrong transmission.

Next, steps in the operation acceptance process executed on the printer 5A will be described with reference to the flowchart in FIGS. 5A-5C. The operation acceptance process is performed according to the operation acceptance program 62A. The CPU 51A of the printer 5A executes the operation acceptance process in response to receiving a user operation via the user interface 53A.

In S301 at the beginning of the operation acceptance process, the CPU 51A determines whether input of login information has been received. For example, the printer 5A receives a user ID and password inputted through the user interface 53A. The login information may also be inputted by scanning an ID card, fingerprint, or palmprint, for example.

If the CPU 51A determines that login information has been received (S301: YES), in S302 the CPU 51A determines whether authentication has been successful based on the received login information. The CPU 51A may perform authentication on the printer 5A or may perform authentication using an external device such as an authentication server. The method of authentication on the printer 5A may be the same as or different from the method of authentication on the client PC 1. When the CPU 51A determines that login information has not been received (S301: NO) or determines that authentication has not been successful (S302: NO), the CPU 51A returns to S301 and once again prompts the user for login information.

When the CPU 51A determines that authentication has been successful (S302: YES), in S303 the CPU 51A acquires the current mode settings based on the mode information 64A. Based on the acquired mode settings, the CPU 51A displays a menu on the user interface 53A to receive commands for acceptable processes.

Specifically, if the CPU 51A determines that both the storage mode and the shared mode are disabled (S303: neither), in S304 the CPU 51A displays another menu. This menu is a menu that accepts neither a storage print command nor a shared print command A storage print command is a print command for executing a printing operation based on a print job stored in the memory 52A. A shared print command is a print command for executing a printing operation based on a print job stored on the server 3.

However, if the CPU 51A determines that the storage mode is enabled (S303: storage), in S305 the CPU 51A displays a storage menu on the user interface 53A. The storage menu is a menu that accepts a storage print command but does not a shared print command.

After displaying the storage menu, in S311 the CPU 51A determines whether a storage print command has been received. If the CPU 51A determines that a storage print command has been received (S311: YES), in S312 the CPU 51A displays a list of print jobs currently stored in the memory 52A on the user interface 53A. In S313 the CPU 51A determines whether a selection for a print job to be printed from the displayed list has been received. While the CPU 51A determines that a selection has not been received (S313: NO), the CPU 51A continues to wait until a selection is received. When the CPU 51A determines that a selection for a print job to be printed has been received (S313: YES), in S314 the CPU 51A controls the printing engine 55A to print the selected print job. Thus, the printer 5A in the storage mode executes a print based on a print job stored in the memory 52A.

However, if the CPU 51A determines that the shared mode is enabled (S303: shared), in S306 the CPU 51A displays a shared menu on the user interface 53A. The shared menu is a menu that accepts a shared print command but does not accept a storage print command Thus, the printer 5A restricts storage printing by not accepting a storage print command when the shared mode is enabled.

After displaying the shared menu, in S321 the CPU 51A determines whether a shared print command has been received. If the CPU 51A determines that a shared print command has been received (S321: YES), in S322 the CPU 51A accesses the server 3 using the administrator account information 65A stored in the memory 52A. The administrator account information 65A is information on accounts having read permission for the shared folder 45 on the server 3. By using the administrator account information 65A, the printer 5A can read print jobs stored on the server 3.

In S323 the CPU 51A acquires, based on the login information received in S301, a list of print jobs for the currently logged-in user from the server 3. For example, the printer 5A acquires the user ID based on the login information, retrieves a folder from the shared folder 45 having a name corresponding to the user ID, and acquires a list of the print jobs stored in this folder. In S324 the CPU 51A displays a list of print jobs on the user interface 53A based on the list acquired in S323. By enabling the selection of only those print jobs for the logged-in user, the security of print jobs can be ensured.

In S325 the CPU 51A determines whether a selection for a print job to be printed has been received from the displayed list. When the CPU 51A determines that no selection has been received (S325: NO), the CPU 51A continues to wait until a selection is received. When the CPU 51A determines that a print job selection has been received (S325: YES), in S326 the CPU 51A acquires the selected print job from the server 3 and in S327 controls the printing engine 55A to perform a print based on the acquired print job. Thus, the printer 5A in the shared mode executes a printing operation based on a print job stored on the server 3.

In the printer 5A set to the shared mode, a reception of a shared printing command in S321, a reception of a selection for a print job in S325, a reception of a command to execute a print are each an example of the prescribed input operation. In this case a reception of login information in S301 is also an example of the prescribed input operation. In response to receiving these input operations, the printer 5A executes a print based on a print job stored on the server 3.

As described above, even if print jobs are stored in the memory 52A, the printer 5A does not accept a storage print command to print the stored print jobs when the shared mode is enabled on the printer 5A. Here, storage print commands not accepted by the printer 5A are not limited to commands performed through user operations in the menu, but also include print commands received internally through preset conditions for executing printing operations, for example. Examples of such preset conditions are a successful user authentication, and the arrival of a specified print time. Thus, if a print job having a set print time is stored in the memory 52A but the shared mode is enabled, the printer 5A does not print that print job even when the print time arrives.

After displaying the other menu in S304 or when the CPU 51A determines in S311 that a storage print command has not been received while in the storage mode (S311: NO) or when the CPU 51A determines in S321 that a shared print command has not been received while in the shared mode (S321: NO), in S331 the CPU 51A determines whether a command to change a mode setting has been received. A command to change a mode setting can be received in the menu for any mode.

If the CPU 51A determines that a command to change a mode setting has been received (S331: YES), in S332 the CPU 51A executes a mode modification process. Steps in the mode modification process will be described next with reference to the flowchart in FIG. 6.

Figure 6:
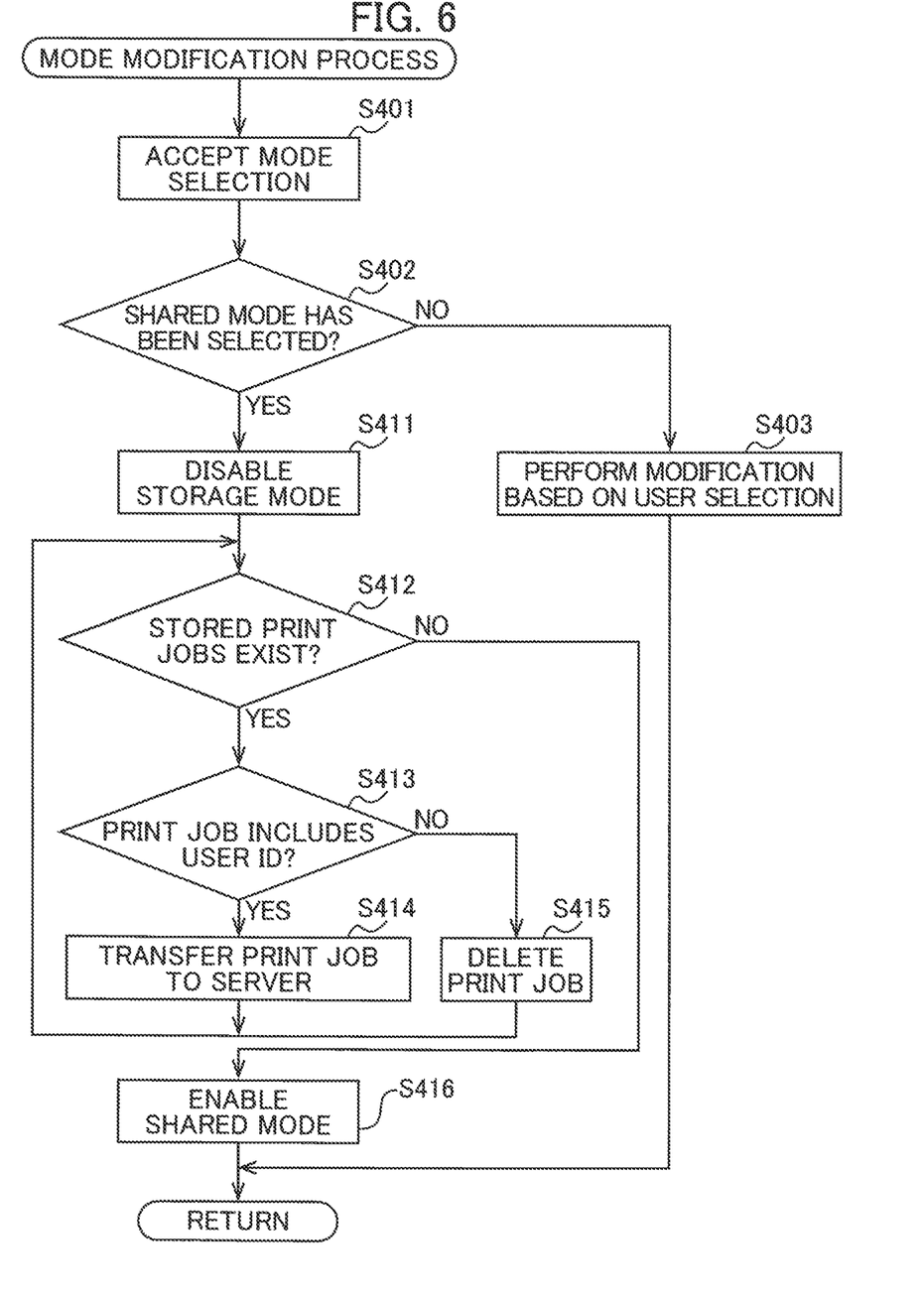
FIG. 6 is a flowchart illustrating steps in a mode modification process performed in the printing system.

In S401 of the mode modification process, the CPU 51A accepts a selection for a new mode setting. In S402 the CPU 51A determines whether the selection received in S401 is a selection to enable the shared mode. If the CPU 51A determines that a selection for enabling the shared mode has not been received (S402: NO), in S403 the CPU 51A modifies the mode information 64A based on the user selection. That is, when the CPU 51A has received a selection to enable the storage mode or a selection to disable both the storage mode and the shared mode, the CPU 51A disables the shared mode and enables or disables the storage mode based on the user selection.

If the CPU 51A has received a selection to enable the shared mode (S402: YES), in S411 the CPU 51A modifies the mode information 64A to disable the storage mode. In S412 the CPU 51A determines whether there are print jobs currently stored in the memory 52A. If the CPU 51A determines that print jobs exist (S412: YES), in S413 the CPU 51A checks each stored print job one at a time to determine whether a user ID is added to the print job.

When the CPU 51A determines that a user ID is added to the print job (S413: YES), in S414 the CPU 51A transfers that print job to the server 3. Specifically, the CPU 51A accesses the server 3 using the administrator account information 65A and transmits the print job to a folder in the shared folder 45 having a name corresponding to the user ID included with the print job, for example. After transmitting the print job, the CPU 51A deletes this print job from the memory 52A.

However, if the CPU 51A determines that a user ID is not added to the print job (S413: NO), in S415 the CPU 51A deletes this print job from the memory 52A.

After completing the process in step S414 or S415, the CPU 51A returns to S412 and determines whether any stored print jobs remain in the memory 52A. When the CPU 51A determines that there are no more stored print jobs (S412: NO), in S416 the CPU 51A enables the shared mode. After completing step S403 or S416, the CPU 51A ends the mode modification process and returns to the operation acceptance process.

Figure 5A:
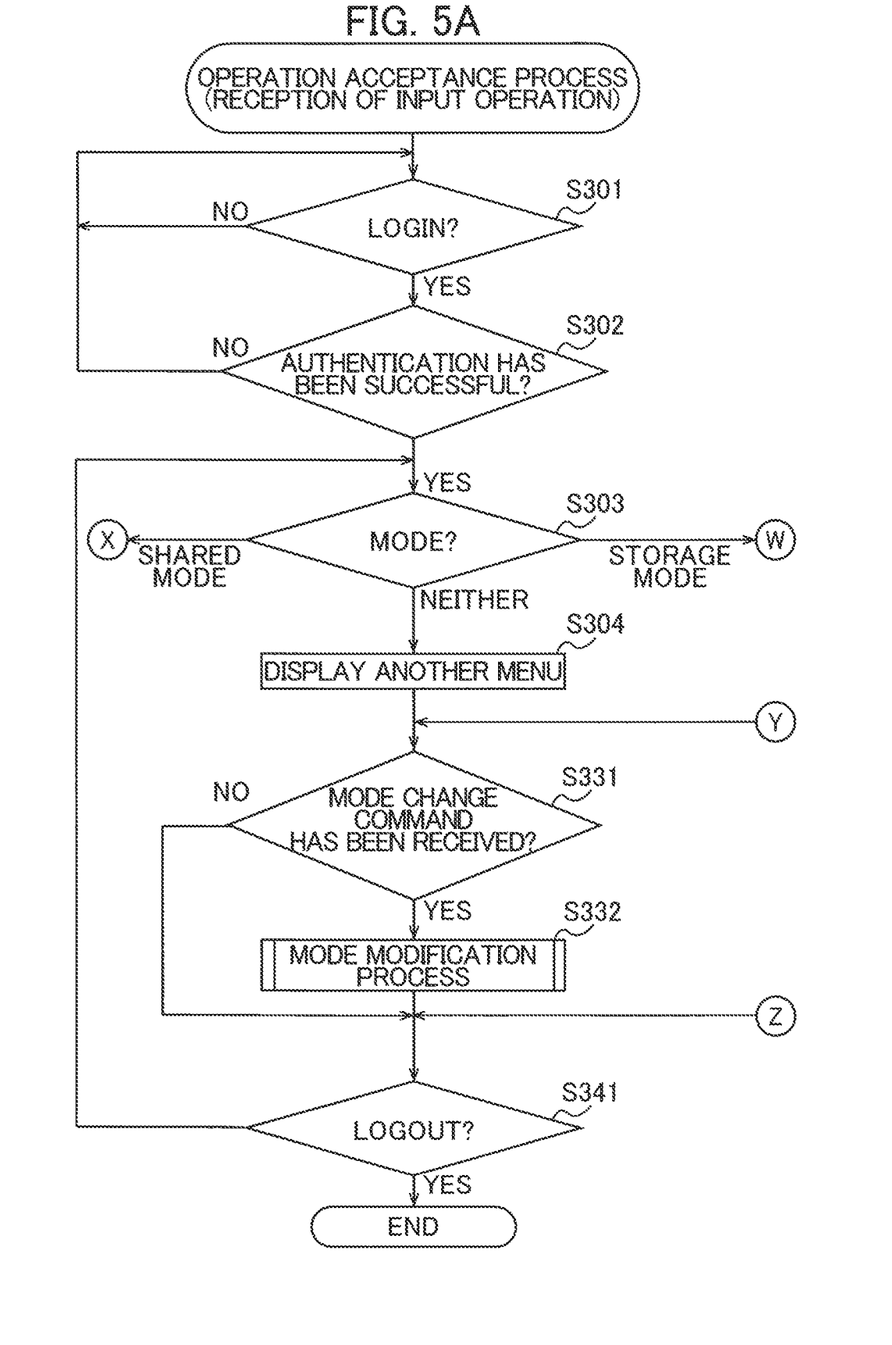
FIG. 5A is a part of a flowchart illustrating steps in an operation acceptance process performed in the printing system.
Figure 5B:
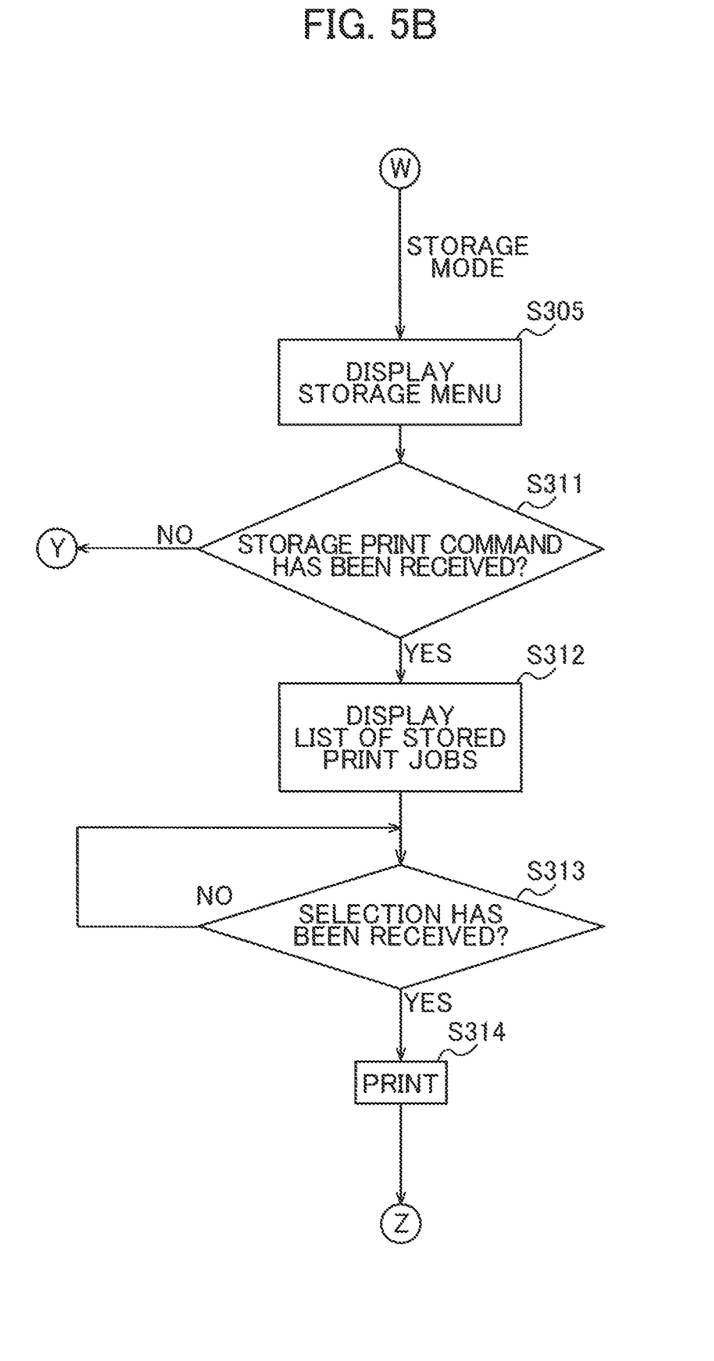
FIG. 5B is another part of the flowchart illustrating the operation acceptance process performed in the printing system.
Figure 5C:
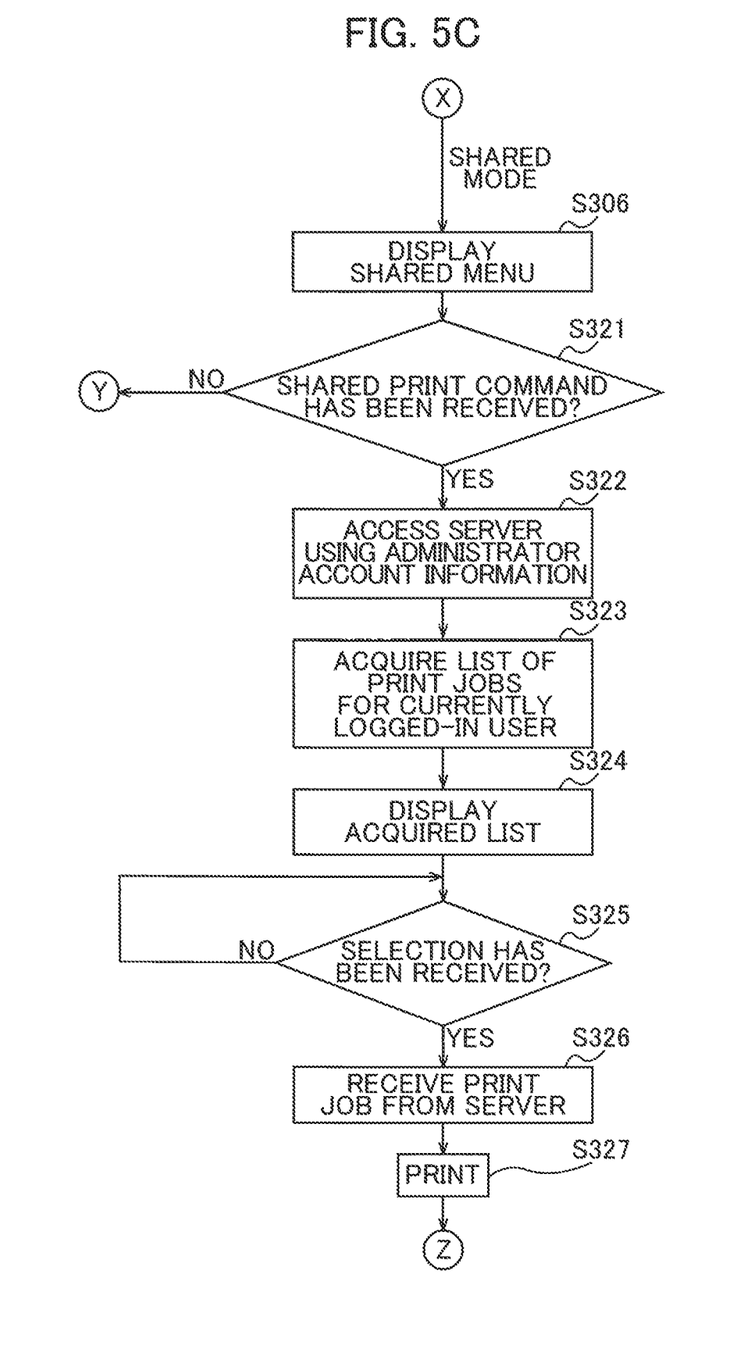
FIG. 5C is the remaining part of the flowchart illustrating the operation acceptance process performed in the printing system.

Returning to the operation acceptance process in FIGS. 5A-5C, after step S314 or S327 or after completing the mode modification process of S332 or when the CPU 51A determines in S331 that a command to modify the mode has not been received (S331: NO), in S341 the CPU 51A determines whether a logout command has been received. If the CPU 51A determines that a logout command has not been received (S341: NO), the CPU 51A returns to S303, displays a menu based on the mode settings, and accepts user commands. However, when a logout command has been received (S341: YES), the CPU 51A ends the operation acceptance process.

In the printing system 100 according to the present embodiment, the printer 5A and printer 5B can be set to different modes from each other. The printing system 100 according to the present embodiment is particularly effective for cases in which printers of different modes exist side-by-side since user error can easily occur. For example, if the user intends to store a print job on the printer 5A but mistakenly transmits the print job to the printer 5B while the storage mode is enabled on the printer 5A and the shared mode is enabled on the printer 5B, the printer 5B in the shared mode does not store the print job received from the user. Thus, the printer 5B in the shared mode reduces load on its memory by not storing print jobs. Further, if the printer 5B transfers the received print job to the server 3, the user can subsequently use the printer 5B to execute a print based on the print job stored on the server 3.

Although the printer 5A does not accept a storage print command while the share mode is enabled in the above example, the printer 5A may instead accept a storage print command but simply not display a list of the print jobs stored in the memory 52. Specifically, the printer 5A may be configured to display a menu that can accept a storage print command regardless of mode but skip step S312 in the operation acceptance process when in the shared mode.

As described above, the printer 5A and printer 5B in the printing system 100 of the present embodiment support both the storage mode and the shared mode. When the shared mode is enabled on a printer, the printer is likely to be used by a plurality of users through shared printing, but printing in the storage mode (i.e. storage printing) is restricted. A printer in the shared mode does not store a print job received from the client PC 1, for example. Further, even when print jobs are stored on the printer, the printer does not accept a print command for such print jobs when in the shared mode. If a user mistakenly transmits a print job to a printer in the shared mode, the printer is restricted from printing that job, thereby ensuring the security of print jobs by preventing a third party from performing a print based on such print jobs.

Further, in the present embodiment, when a printer whose shared mode is enabled receives a print job that includes only command data and no image, the printer executes a process based on the received print job. Accordingly, the printer can be controlled to perform processes for setting parameters and the like even when the printer is set to the shared mode. If a printer in the shared mode receives a print job that includes an image, the printer does not store the print job but rather deletes the print job or transfers the print job to the server 3, thereby reducing load on the printer's memory. If the printer transfers the print job to the server 3, the user can subsequently use the printer to read the print job from the server 3 and print that print job.

If the mode setting on the printer 5A or 5B of the present embodiment is changed from the storage mode to the shared mode, any print jobs stored on the printer are deleted or transferred to the server 3. Deleting print jobs in this way reduces load on the printer's memory. Alternatively, if the print jobs are transferred to the server 3, a printer in the shared mode can be used to extract those print jobs from the server 3 and print the print jobs. In this way, the print jobs can still be printed, even if the mode of a printer is accidentally switched.

The embodiment described above is merely an example, and the present disclosure is not intended to be limited by this example. It would be apparent to those skilled in the art that various improvements and modifications may be made to the technology disclosed in this specification. For example, the devices in the specification may be of any number and are not limited to the numbers of devices shown in the drawings. Further, the client PC is not limited to a PC, but may be a smartphone or tablet computer, for example.

Further, the printer 5A or 5B may be any device having at least a printing function, such as a multifunction peripheral, a copy machine, or a facsimile machine. If the printer 5A or 5B possesses functions in addition to the printing function, the printer 5A or 5B need not require login authentication for users using the functions other than the printing function, for example. In this case, the printer 5A or 5B may receive a selection for a function to use prior to authentication and may require the user to input login information only when a printing command has been received.

While the printers 5A and 5B in the present embodiment have both a storage mode and a shared mode, the printers may be provided with just one of the modes instead. In other words, the printing system 100 may include printers whose mode cannot be modified. In this case, it does not matter whether printers in the storage mode can communicate with the server 3. Further, while both the storage mode and the shared mode can be disabled on the printers 5A and 5B in the present embodiment, the printers may be configured to require that one mode be enabled. In this case, the process performed when neither mode is enabled, i.e., the process for automatically performing a print based on a print job transmitted directly from the client PC 1 (S202 in the reception process) may be omitted.

Further, when the printer mode is changed from the storage mode to the shared mode in the present embodiment, print jobs stored on the printer are transferred to the server 3 or deleted. However, the print jobs may be left stored on the printer instead. If transferred to the server 3, print jobs can be printed using a printer in the shared mode. If the print jobs are deleted, the load on the printer memory is reduced. However, if left stored on the printer, the print jobs can be printed once the mode has been returned to the storage mode.

Further, when the shared mode is enabled on the printer 5A or 5B in the present embodiment, the printer does not store print jobs received from the client PC 1. However, the printer may instead be configured to store print jobs in this case. Specifically, the printer 5A or 5B may store a print job received from the client PC 1 regardless of the mode settings and subsequently may determine in the operation acceptance process whether a stored print job is to be printed based on the mode settings. This configuration can still restrict printers in the shared mode from executing prints based on stored print jobs. In other words, this configuration can still restrict storage printing.

In the present embodiment, the client PC 1 adds a user ID to the print job to be transmitted to the server 3, and the server 3 creates, in the shared folder 45, a folder having a name corresponding to the user ID added to the print job received from the client PC 1. However, when a print job received from the client PC 1 has no user ID added thereto, the server 3 may analyze the print job to acquire the user ID and may create a folder having a name corresponding to the user ID, for example. Alternatively, the client PC 1 may transmit an instruction to the server 3 for creating a folder in the shared folder 45 for each user. Creating a folder for each user reduces the processing load on the printer 5A or 5B required for extracting print jobs for a user in the subsequent operation acceptance process.

Further, the server 3 may be provided with a program such as a printer driver capable of processing print jobs received from the client PC 1. In this case, rather than generating a print job using the shared printer driver 22 when a shared printer has been selected, the client PC 1 may generate intermediate data suitable for processing on the printer driver or the like on the server 3 and may transmit this intermediate data to the server 3.

The server 3 may also be configured to delete a print job received from the client PC 1 if the print job has not been generated for shared printing. For example, the client PC 1 may attach information indicating storage printing to a print job intended to be stored and subsequently printed through storage printing. In this case, the server 3 may delete a print job received from the client PC 1 when the print job includes such information specifying storage printing. Further, print jobs to be stored on printers may be configured with a password or the like that must be inputted into the printer in order to print the print job. Hence, when a print job configured with a password or the like is received, the server 3 may simply delete the print job.

In any of the flowcharts disclosed in the embodiment, the plurality of processes that make up any of the plurality of steps may be executed in parallel, or the order in which the processes are performed may be modified in any way that does not produce any inconsistencies in the processes.

The processes disclosed in the embodiment may be executed by a single CPU, a plurality of CPUs, an ASIC or other hardware, or a combination of these components. Further, the processes disclosed in the embodiment may be achieved through a storage medium that stores the programs used to implement those processes or according to any of various other methods or formats.

What is claimed is:

1. A printer comprising:
a printing engine;
a user interface;
a communication interface;
a memory; and
a controller comprising hardware configured to perform:
(a) disabling a first mode of the printer when enabling a second mode of the printer;
(b) disabling the second mode when enabling the first mode;
(c) executing a first printing process in a state where the first mode is enabled, the first printing process including:
(c1) in response to receiving a print job from a client device via the communication interface, storing the received print job in the memory; and
(c2) in response to receiving a storage print command, controlling the printing engine to perform a print based on a first specific print job, the storage print command being a print command to print based on the first specific print job, the first specific print job being the print job stored in the memory in (c1);
(d) executing a second printing process in a state where the second mode is enabled, the second printing process including:
(d1) accepting a prescribed input operation via the user interface;
(d2) in response to accepting the prescribed input operation in (d1), receiving a print job from a server via the communication interface, the server including a server memory, the print job received from the server being a print job stored in the server memory by the server in response to the print job being received by the server from the client device; and
(d3) controlling the printing engine to perform a print based on a second specific print job, the second specific print job being the print job received from the server in (d2);
(e) in a state where the second mode is enabled, restricting the first printing process based on a print job transmitted from the client device; and
(f) in a state where the first mode and the second mode are both disabled:
(f1) receiving a print job transmitted from the client device via the communication interface; and
(f2) in response to receiving the print job in (f1), controlling the printing engine to perform a print based on the print job received in (f1).

2. The printer according to claim 1,
wherein the restricting in (e) is performed by not accepting a specific operation performed via the user interface, the specific operation being an input operation concerning the print based on the print job received from the client device.

3. The printer according to claim 2,
wherein the controller is configured to further perform:
(g) displaying the first specific print job on the user interface, wherein the storage print command includes a specific storage print command, the specific storage print command being a print command to print based on a third specific print job, the third specific print job being the first specific print job displayed on the user interface in (g),
wherein, in the controlling in (c2), the controller controls the printing engine to perform a print based on the third specific print job in response to receiving the specific storage print command, and
wherein the restricting in (e) is performed by not displaying the first specific print job on the user interface.

4. The printer according to claim 1,
wherein the controller is configured to further perform:
(h) in a state where the second mode is enabled, receiving a print job transmitted from the client device via the communication interface, and
wherein the restricting in (e) is performed by deleting the print job received in (h).

5. The printer according to claim 1,
wherein the controller is configured to further perform:
(i) in a state where the second mode is enabled, receiving a print job transmitted from the client device via the communication interface, and
wherein the restricting in (e) is performed by transferring the print job received in (i) to the server via the communication interface.

6. The printer according to claim 1,
wherein the restricting in (e) is performed by not receiving a print job transmitted from the client device.

7. The printer according to claim 1,
wherein the controller is configured to further perform, in a state where the second mode is enabled:
(j) receiving a print job transmitted from the client device via the communication interface; and
(k) when the print job received in (j) includes command data but does not include image data, executing a process in conformance with the command data,
wherein the restricting in (e) is performed when the print job received in (j) includes image data.

8. The printer according to claim 1,
wherein the controller is configured to further perform:
(l) in response to the second mode being set enabled from a state where the first mode is enabled, deleting the first specific print job from the memory.

9. The printer according to claim 1,
wherein the controller is configured to further perform:
(m) in response to the second mode being set enabled from a state where the first mode is enabled, transferring the first specific print job to the server.

10. A printing system comprising:
a printer, a server, and a client device which are configured to communicate with one another,
the printer including a printer memory and a user interface, the printer being provided with a first mode and a second mode, the printer being configured to:
disable the first mode when enabling the second mode; and
disable the second mode when enabling the first mode,
the client device possessing:
a function to output a first print job, the first print job being a print job whose transmission destination is set to the printer; and
a function to output a second print job, the second print job being a print job whose transmission destination is set to the server, the server including a server memory, the server being configured to:
  in response to receiving the second print job from the client device, store the received second print job in the server memory,
wherein the printer is further configured to, in a state where the first mode is enabled:
  (a) receive the first print job from the client device;
  (b) store the received first print job in the printer memory; and
  (c) in response to receiving a storage print command, perform a print based on the stored first print job, the storage print command being a print command to print based on the stored first print job,
wherein the printer is further configured to, in a state where the second mode is enabled:
  (d) accept a prescribed input operation via the user interface;
  (e) in response to accepting the prescribed input operation, receive the second print job stored in the server memory from the server;
  (f) perform a print based on the received second print job; and
  (g) restrict a print based on the first print job, and
wherein the printer is further configured to, in a state where the first mode and the second mode are both disabled:
  (h) receiving the first print job transmitted from the client device; and
  (i) in response to receiving the first print job in (h), controlling the printing engine to perform a print based on the first print job received in (h).

11. The printing system according to claim 10, comprising:
  a plurality of the printers, one of the plurality of the printers being in a state where the first mode is enabled, another of the plurality of the printers being in a state where the second mode is enabled.

12. The printing system according to claim 10,
wherein the client device is configured to:
  (j) acquire user identification information via a user interface of the client device; and
  (k) before outputting the second print job, add the acquired user identification information to the second print job;
wherein the server is further configured to:
  (l) in response to receiving the second print job having the user identification information added thereto from the client device, store the received second print job in the server memory in association with the user identification information added to the received second print job, and
wherein the printer is further configured to:
  (m) receive user identification information via the user interface of the printer;
  (n) receive a specific print job from the server, the specific print job being the second print job stored in the server memory in association with the user identification information received via the user interface of the printer; and
  (o) perform a print based on the specific print job received from the server.

13. The printing system according to claim 10,
wherein the client device has a first print queue and a second print queue, and
wherein the output of the first print job is performed by transmitting the first print job via the first print queue, and the output of the second print job is performed by transmitting the second print job via the second print queue.

* * * * *